United States Patent
Jenkinson et al.

(10) Patent No.: US 9,886,573 B2
(45) Date of Patent: Feb. 6, 2018

(54) NON-REPUDIATION OF BROADCAST MESSAGING

(71) Applicant: Red Hat, Inc., Raleigh, NC (US)

(72) Inventors: Tom Jenkinson, New Castle upon Tyne (GB); Paul Robinson, New Castle upon Tyne (GB)

(73) Assignee: RED HAT, INC., Raleigh, NC (US)

( * ) Notice: Subject to any disclaimer, the term of this patent is extended or adjusted under 35 U.S.C. 154(b) by 161 days.

(21) Appl. No.: 14/820,238

(22) Filed: Aug. 6, 2015

(65) Prior Publication Data

US 2017/0039365 A1  Feb. 9, 2017

(51) Int. Cl.
*H04L 9/32* (2006.01)
*G06F 21/45* (2013.01)

(52) U.S. Cl.
CPC .............. *G06F 21/45* (2013.01); *H04L 9/321* (2013.01); *H04L 9/3247* (2013.01)

(58) Field of Classification Search
CPC ..... H04L 9/321; H04L 9/3202; H04L 9/3247; H04L 9/3297; H04L 2209/56; H04L 63/12–63/126; H04L 2463/102; H04L 2463/121; H04L 12/5875; G06Q 20/389; G06F 21/45
See application file for complete search history.

(56) References Cited

U.S. PATENT DOCUMENTS

| | | |
|---|---|---|
| 7,500,096 B2 | 3/2009 | Lang et al. |
| 7,568,106 B2 | 7/2009 | Goodman et al. |
| 8,386,790 B2 | 2/2013 | Bhattacharya et al. |
| 8,806,214 B2 | 8/2014 | Sudhakar |
| 2010/0100465 A1 | 4/2010 | Cooke et al. |

FOREIGN PATENT DOCUMENTS

| | | |
|---|---|---|
| WO | WO0130016 A2 | 4/2001 |
| WO | WO03081840 A1 | 10/2003 |

OTHER PUBLICATIONS

Bahreman et al., Certified Electronic Mail, 1994.*
Coffey et al., Non-Repudiation with Mandatory Proof of Receipt, 1996.*
Farrell, Introducing the Java Message Service, IBM, 2004.*
Ford, Computer Communications Security—Principles, Standard Protocols and Techniques, PTR Prentice Hall, 1994, pp. 199-215.*
Kremer et al., An Intensive Survey of Fair Non-Repudiation Protocols, 2002.*
Sheedy et al., Information Privacy and Registered Certified Mail—What Do the People Want?, 22nd Conference on Postal and Delivery Economics, Jun. 2014, pp. 195-206.*

(Continued)

*Primary Examiner* — Minh Dinh
(74) *Attorney, Agent, or Firm* — Haynes and Boone, LLP

(57) ABSTRACT

A method performed by a computing system includes receiving from a publishing entity a message and a first piece of evidence that the message was sent by the publishing entity, time-stamping the first piece of evidence, storing the time-stamped first piece of evidence, sending the message to a first subscribing entity, receiving from the first subscribing entity a second piece of evidence that the message was received by the first subscribing entity, time-stamping the second piece of evidence, and storing the time-stamped second piece of evidence.

19 Claims, 4 Drawing Sheets

(56) References Cited

OTHER PUBLICATIONS

Zhou et al., Evidence and non-repudiation, 1997.*
Li Yanping and Pang Liaojun, Multiparty Nonrepudiation Protocol with Different Message Exchanged, 2009, pp. 491-494, vol. 1, Information Assurance and Security, 2009. IAS '09. Fifth International Conference on, Xian.
Jose A. Onieva, Jianying Zhou, Javier Lopez, Non-repudiation protocols for multiple Entities, Elsevier Science, May 27, 2004, pp. 1-19, Malaga, Spain.
Olivier Markowitch and Steve Kremer. An Optimistic Non-Repudiation Protocol with Transparent Trusted Third Party, pp. 1-16, Belgium.
Lei Li, Licheng Wang, Jing Chen, Ruiming Wang, and Zhihong Zhang, Fairness Analysis for Multiparty Nonrepudiation Protocols Based on Improved Strand Space, Discrete Dynamics in Nature and Society, 2013, pp. 1-7, vol. 2014, China.

* cited by examiner

NON-REPUDIATION OF BROADCAST MESSAGING

BACKGROUND

The present disclosure relates generally to communication systems, and more particularly to methods and systems for managing non-repudiation for broadcast messaging systems.

Various entities use a variety of electronic communication mechanisms to communicate with each other. One challenge that arises with the use of such electronic communication is authenticity. Specifically, when a recipient of an electronic message receives that message, he or she generally desires to know whether the message is authentic. In other words, the recipient desires to know that the purported sender is in fact the actual sender of the message. In addition, the recipient may desire that the message have a property referred to as non-repudiation. Non-repudiation in this case refers to the inability of the sender to challenge the validity of the message sent by the sender.

These concerns are in place on behalf of the sender as well. When the sender sends a message to a recipient, the recipient typically sends an acknowledgement that the message has been received. The sender may wish to know that this acknowledgement is authentic and that the recipient does not have the ability to challenge that authenticity.

One way to provide non-repudiation is through use of non-repudiation evidence such as digital signatures. In other words, the sender of a message can digitally sign the message, thereby indicating that the message is an authentic message from the sender. Similarly, the recipient of the message can provide non-repudiation evidence that the message has been received. To avoid an unfair situation in which either the sender or recipient provides non-repudiation evidence before the other, a trusted third party can be used. Specifically, the non-repudiation evidence can be given to a trusted third party. The trusted third party can then provide the sender's non-repudiation evidence the recipient and provide the recipient's non-repudiation evidence to the sender when both have been received by the trusted third party.

Given the various mechanisms used for electronic communication, it is desirable to use mechanisms to ensure that both senders and receivers of messages can have assurance that the messages they receive and send are authentic.

SUMMARY

According to one example, a method performed by a computing system includes receiving from a publishing entity a message and a first piece of evidence that the message was sent by the publishing entity, time-stamping the first piece of evidence, storing the time-stamped first piece of evidence, sending the message to a first subscribing entity, receiving from the first subscribing entity a second piece of evidence that the message was received by the first subscribing entity, time-stamping the second piece of evidence, and storing the time-stamped second piece of evidence.

According to one example, a system includes a processor and a memory comprising machine readable instructions that when executed by the processor, cause the system to receive, from a publishing entity, a message and a first piece of evidence that the message was sent by the publishing entity, time-stamp the first piece of evidence, send the message to a subscribing entity, receive from the subscribing entity a second piece of evidence that the subscribing entity has received the message, and time-stamp the second piece of evidence.

According to one example, a method includes receiving from a publishing entity a message to be published under a topic and a first piece of evidence that the message was sent by the publishing entity, processing the first piece of evidence, sending the message to a plurality of subscribing entities, receiving from one of the plurality of subscribing entities a second piece of evidence that the one of the plurality of subscribing entities has received the message, processing the second piece of evidence.

Figure 1:
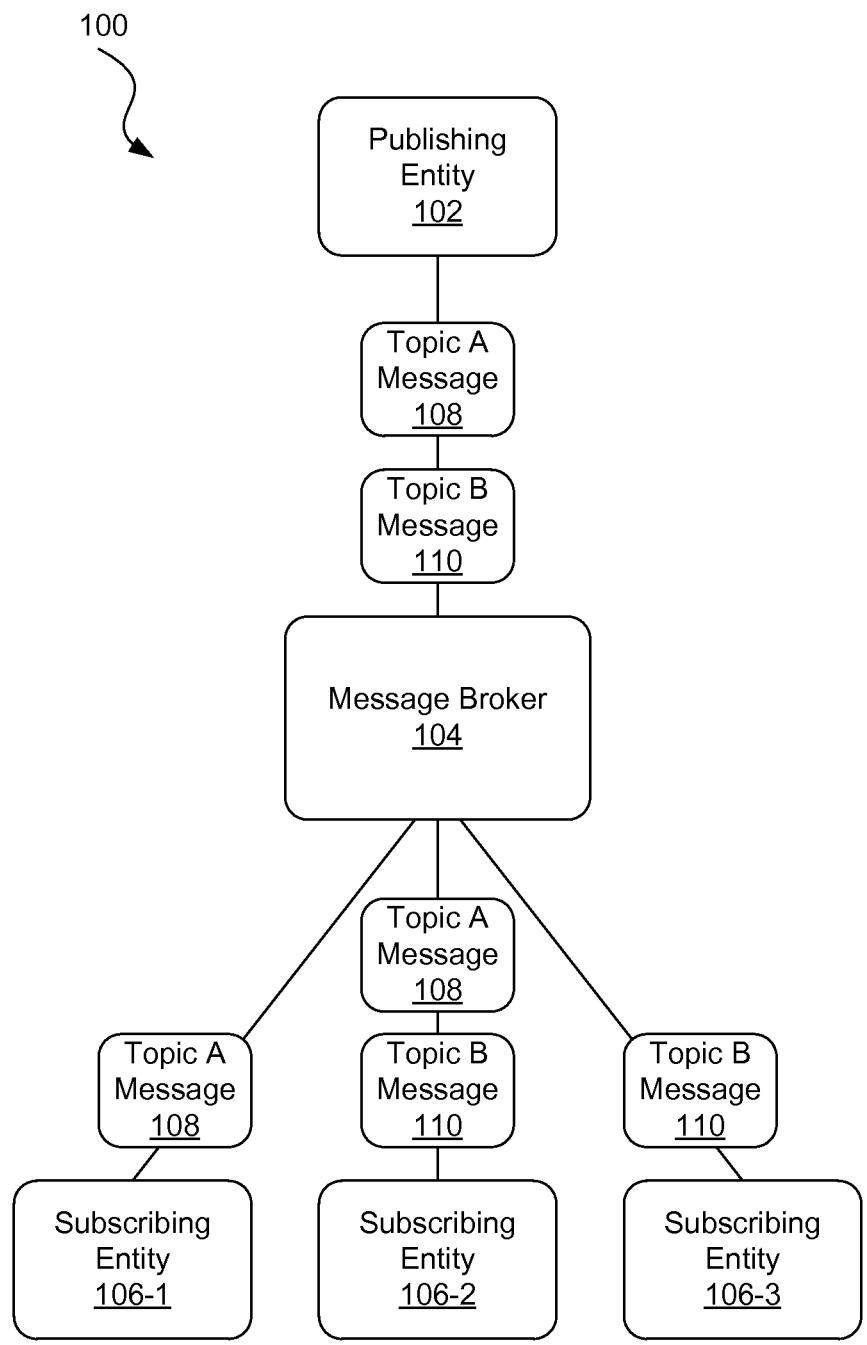
FIG. 1 is a diagram showing broadcast messaging that provides non-repudiation, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to use mechanisms to ensure that both senders and receivers of messages can have assurance that the messages they receive and send are authentic. This may also be the case for broadcast messaging. Broadcast messaging typically involves a sender that sends a message to a plurality of recipients. One type of broadcast messaging is a publish-and-subscribe messaging service. In a publish-and-subscribe messaging service, a publishing entity publishes a message to a particular category referred to as a topic. That message is then sent to any subscribing entities that subscribe to that topic.

According to principles described herein, methods and systems provide for non-repudiation of broadcast messaging that use a publish-and-subscribe model through use of a trusted third party. In one example, the broadcast messaging service is a Java Message Service (JMS). In such a case, the JMS server acts as a trusted third party when handing messages between publishing JMS clients and subscribing JMS clients.

In one example, a publishing entity sends the message to be published as well as the topic to which it is to be published to a message broker (i.e., the JMS server). The publishing entity also provides non-repudiation evidence for that message to the message broker. The message broker than certifies that the evidence is sufficient and stores the evidence in case it is to be used at a later time. The message broker then sends the message to each of the subscribing entities that subscribe to that topic. When a subscribing entity sends back an acknowledgement that the message has been received, the subscribing entity also sends non-repudiation evidence. The message broker then certifies the subscriber's non-repudiation evidence and stores it in case it is to be used at a later time. At this point neither the publishing entity nor the subscribing entity has the other's non-repudiation evidence. Various mechanisms can be used to provide such evidence if desired. For example, if one entity denies sending or receiving the message, the other entity can request the non-repudiation evidence as proof that the message was sent or received.

Through use of principles described herein, recipients of a published message can be assured that the publisher will not be able to successfully dispute sending the message. Additionally, publishers can be assured that recipients of a published message will not be able to successfully challenge receipt of the message. If either party attempts to deny sending or receiving the message, the other party can obtain the non-repudiation evidence from the message broker and use that as proof that the message was sent or received. This proof may even be taken to court if need be.

FIG. 1 is a diagram showing broadcast messaging that provides non-repudiation. According to the present example, a publishing entity 102 publishes messages 108, 110 for a plurality of subscribing entities 106-1, 106-2, 106-3. The messages 108 pass through a message broker 104. In one example, the message broker 104 may be a JMS server and the publishing entity 102 and subscribing entities 106-1, 106-2, 106-3 may be JMS clients.

The publishing entity 102 may be an individual person or an organization such as a corporation. The publishing entity 102 may use a computing device that has a communication application installed thereon. The computing device may include, but is not limited to, a desktop computer, a laptop computer, a tablet, and a smartphone. In one example, the communication application includes a JMS client.

Each of the subscribing entities 106-1, 106-2, 106-3 may also be an individual person or an organization. Each subscribing entity 106-1, 106-2, 106-3 may use a computing device having a communication application installed thereon. The communication application may include a JMS client.

The message broker 104 includes one or more physical computing systems that provide message brokering services for a messaging service. In the present example, the messaging service is a JMS messaging service. Both the publishing entity 102 and the subscribing entities 106-1, 106-2, 106-3 may have an account registered with the messaging service associated with the message broker 104. Thus, the publishing entity 102 or the subscribing entities 106-1, 106-2, 106-3 may access the messaging service from a variety of different devices. In one example, an entity logs into the service using a username and password.

The subscribing entities 106-1, 106-2, 106-3 may choose to subscribe to various topics. In the present example, subscribing entity 106-1 subscribes to topic A. Subscribing entity 106-2 subscribes to topic A and topic B. Subscribing entity 106-3 subscribes to topic B. In some cases, a topic may be specific to a particular publishing entity. In other cases, multiple publishing entities may publish messages to a particular topic name.

In the present example, the publishing entity publishes a first message 108 to topic A. The publishing entity 102 also publishes a second message 110 to topic B. The publishing entity 102 sends messages 108, 110 to be published to the message broker 104. The message broker then sends those messages to the subscribing entities. In some cases, the publishing entity is not aware of the subscribing entities 106-1, 106-2, 106-3. In other words, the publishing entity 102 may not have access to the list of subscribers to a particular topic.

After receiving the messages 108, 110, the message broker 104 sends the messages to the appropriate subscribing entities 106-1, 106-2, 106-3. In the present example, the first message 108 for topic A is sent to subscribing entity 106-1 and subscribing entity 106-2. The second message 110 for topic B is sent to subscribing entity 106-2 and 106-3. The subscribing entities 106-1, 106-2, 106-3 then send an acknowledgement to the message broker that the respective messages 108, 110 have been received.

It may be the case that the messages 108, 110 are associated with a product or service providing by the publishing entity 102. It may also be the case that the messages 108, 110 represent an offer for goods or services. In such cases, as well as other cases, the subscribing entities 106-1, 106-2, 106-3 may wish to have proof that the sender of the message is in fact the purported sender and that the sender cannot revoke a certification of such. Additionally, the publishing entity 102 may wish to have proof that the subscribing entities 106-1, 106-2, 106-3 have in fact received the message and cannot deny receiving the message.

Figure 2:
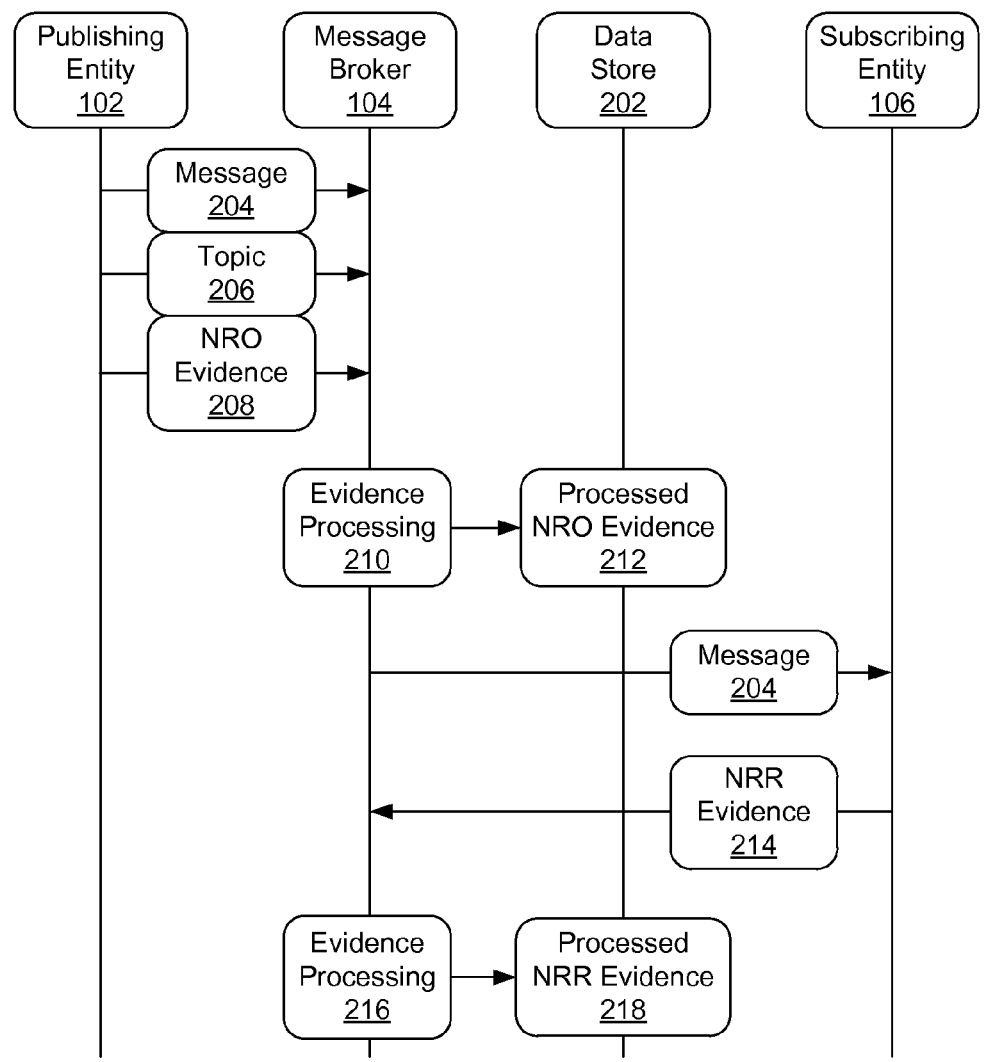
FIG. 2 is a signal diagram showing a method for providing non-repudiation of broadcast messaging, according to one example of principles described herein.

FIG. 2 is a signal diagram showing a method for providing non-repudiation of broadcast messaging. According to one example of principles described herein, the method involves use of a publishing entity 102, a message broker 104, a data store 202, and a subscribing entity 106.

According to the present example, to publish a message 204, the publishing entity 102 sends a copy of that message 204 to the message broker 104. In one example, the message includes text and is in a string format. In some examples, the message 204 may include audio, video, or image files. Along with the message 204, the publishing entity sends the topic 206 under which the message 204 is to be published. The publishing entity 102 also sends evidence 208 of non-repudiation of the message's origin (NRO) to the message broker 104. In one example, the message 204, topic 206, and NRO evidence 208 may be sent as parameters of the publish( ) method of the JMS Application Programming Interface (API). This method acts as a remote procedure call (RPC) to the message broker 104. After the message broker performs its processes associated with the publish method, control of the program returns to the publishing entity and no further action is taken by the publishing entity related to sending the message 204.

The NRO evidence 208 may include any type of evidence that can be used to authenticate that the message was sent by the publishing entity 102. As described above, one type of evidence that can be used involves digital signatures. Digital signatures may involve the use of public key cryptography. Such a digital signature uses three different functions. First, a key generation function selects a private key and a corresponding public key. Second, a signing function uses the private key and the message 204 to produce a digital signature. The NRO evidence 208 may include the signature and the public key. A verification function can then use the public key, the message 204, and the signature to verify that the message 204 is an authentic message sent by the publishing entity 102.

Upon receipt of the NRO evidence 208 from the publishing entity 102, the message broker 104 begins processing 210 the NRO evidence 208. The processing 210 of the NRO evidence 208 involves validating, time-stamping, and storing the processed NRO evidence 212. The message broker 104 may validate the NRO evidence 208 to make sure it complies with any rules that the message broker 104 may have in place regarding the sufficiency of evidence. Validating may also include digitally signing the NRO evidence in order to provide proof that the message broker 104 received the message from the publishing entity 102 for publication. The message broker 104 may time-stamp the NRO evidence 208 as of the date and time the NRO evidence 208 was received. This prevents the publishing entity from revoking the NRO evidence and claiming that someone else has fabricated the NRO evidence after revocation.

After the NRO evidence 208 has been processed, the processed NRO evidence 212 is placed in a data store 202. In one example, the data store 202 is a non-volatile memory store. The data store 202 may be associated with the same computing system or systems that provide the communication service associated with the message broker 104. In some examples, however, the data store 202 may be a different physical computing system such as a storage server or storage service that is in communication with the physical computing system or systems providing the communication service. In one example, the processed NRO evidence 212 is stored for a predefined period of time. In one example, the period of time may be defined by a service level agreement associated with the message 204. In one example, the service level agreement is associated with the communication service associated with the message broker 104. In some examples, the predefined period of time may be a number of years. In some cases, it may be a number of months. In some cases, it may be a number of days. In some cases, it may be a number of minutes. In such case, either party may wish to obtain their own copy of the evidence before the predefined period of time expires.

At some point in time after the message 204 has been received and the NRO evidence 208 has been processed, the message 204 is published. In the present example, publishing the message 204 involves sending the message to the subscribing entity 106. In response to receiving the message 204, the subscribing entity sends evidence of non-repudiation of the message's recipient (NRR). In one example, the NRR evidence 214 is sent along within an acknowledgement message. In one example, the NRR evidence 214 is sent as a parameter within an acknowledge( ) method that is part of the JMS API.

Upon receipt of the NRR evidence 214 from the subscribing entity 106, the message broker 104 begins processing 216 the NRR evidence 214. The processing 216 of the NRR evidence 214 involves validating, time-stamping, and storing the processed NRR evidence 218. The message broker 104 may validate the NRR evidence 214 to make sure it complies with any rules that the message broker 104 may have in place regarding the sufficiency of evidence. Validating may also involve digitally signing the NRR evidence to provide proof that the message broker 104 has received acknowledgement from the subscribing entity 106 that the message has been received. The message broker 104 may time-stamp the NRR evidence 214 as of the date and time the NRR evidence 214 was received.

After the NRR evidence 214 has been processed, the processed NRR evidence 214 is placed in the data store 202. In one example, the processed NRR evidence 218 is stored for a predefined period of time. In one example, the period of time may be defined by a service level agreement associated with the message 204.

At this point, neither the publishing entity 102 nor the subscribing entity 106 has the non-repudiation for the other party. In some cases, neither party may have use for the non-repudiation evidence because neither party is challenging the authenticity of the message 204. But, if either party decides to challenge the authenticity of publication or receipt of the message 204, then the other party may have use for the non-repudiation evidence for the other party.

Figure 3:
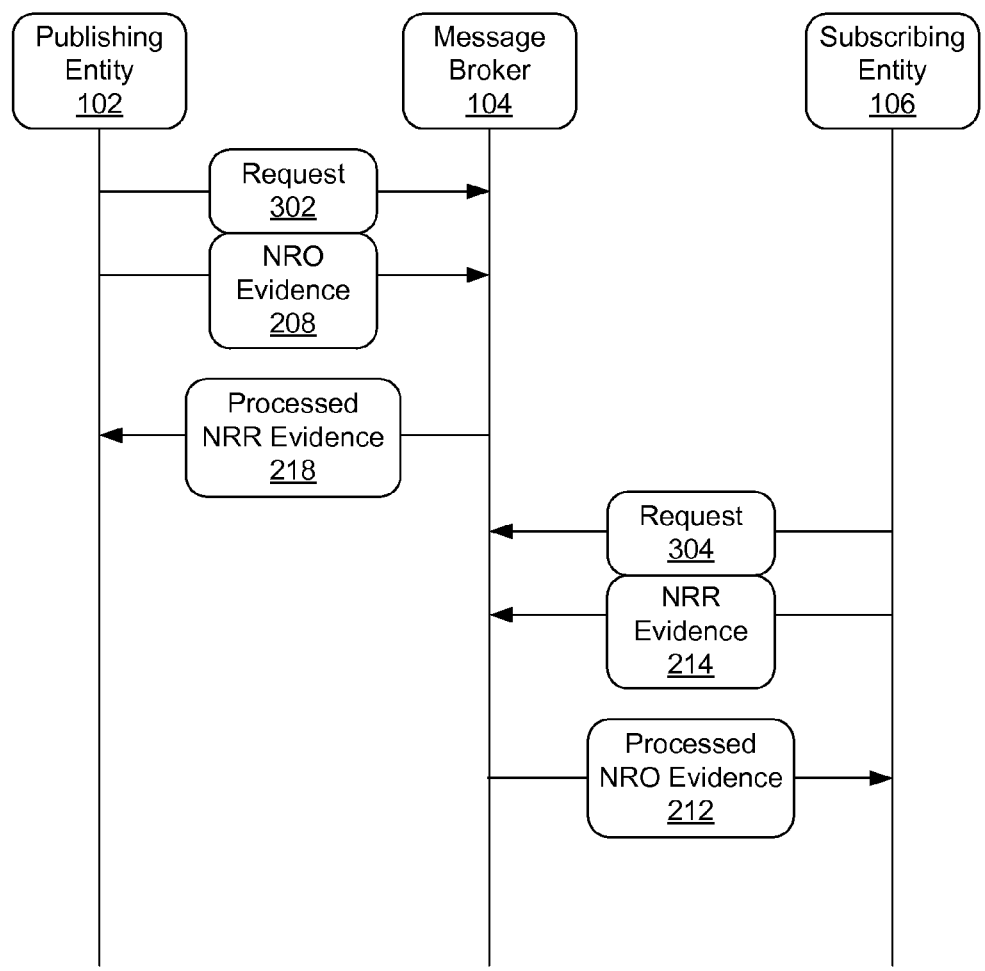
FIG. 3 is a signal diagram showing a method for obtaining non-repudiation evidence, according to one example of principles described herein.

FIG. 3 is a signal diagram showing a method for obtaining non-repudiation evidence. According to the present example, if the publishing entity 102 desires to obtain the processed NRR evidence 218 to have proof that the subscribing entity 106 did in fact receive the message, then the publishing entity 102 sends a request 302 to the message broker 104 for the NRR processed evidence 218. In addition to sending the request, the publishing entity 102 may also send a copy of its NRO evidence 208. The NRO evidence 208 may thus be used as a validation mechanism to ensure that the publishing entity 102 has the right to obtain the processed NRR evidence 218.

In response to the request 302, the message broker 104 sends the processed NRR evidence 218 back to the publishing entity 102. The message broker 104 may first obtain the processed NRR evidence 218 from the data store (e.g. 202, FIG. 2). In one example, pieces of evidence are stored in a database. An entry in the database may include a copy of the NRO evidence 208 as well as any corresponding pieces of NRR evidence.

In a similar manner, the subscribing entity 106 may desire to obtain the processed NRO evidence 212 to have as proof that the publishing entity 106 did in fact send the message. To do so, the subscribing entity 106 sends a request 304 to the message broker 104 for the processed NRO evidence 218. In addition to sending the request 304, the subscribing entity 106 may also send a copy of its NRR evidence 214. The NRR evidence 214 may thus be used as a validation mechanism to ensure that the subscribing entity 106 has the right to obtain the processed NRO evidence 212. In response to the request 304, the message broker 104 sends the processed NRO evidence 212 back to the subscribing entity 106. Again, the message broker 104 may first obtain the processed NRO evidence 212 from the data store (e.g. 202, FIG. 2).

The pieces of evidence 214, 218 may be used for both authentication and non-repudiation. The subscribing entity 106 may use the NRO evidence 218 to ensure that the message sent by the publishing entity 102 is authentic. The publishing entity 102 may use the NRR evidence 214 as proof that the subscribing entity has acknowledged receipt of the message. Additionally, either party may use the other's evidence as proof that the other party did in fact send or receive the message, thereby preventing the other party from asserting that they did not send or receive the message. As mentioned above, this is referred to as non-repudiation. In some cases, the evidence 214, 218 may be used in front of an adjudicative body such as a court as proof of the other party's actions.

Other mechanisms for providing the pieces of evidence 212, 218 to the publishing entity 102 and subscribing entity 106 are considered. For example, after the message broker 104 processes the NRR evidence 218, the message broker may send the processed pieces of evidence 212, 218 to the respective entities. Specifically, the message broker may send the processed NRR evidence 218 to the publishing entity 102 and send the processed NRO evidence 212 to the subscribing entity 106. In one example, this may be done by placing the evidence as a parameter within standard methods of the JMS API.

Figure 4:
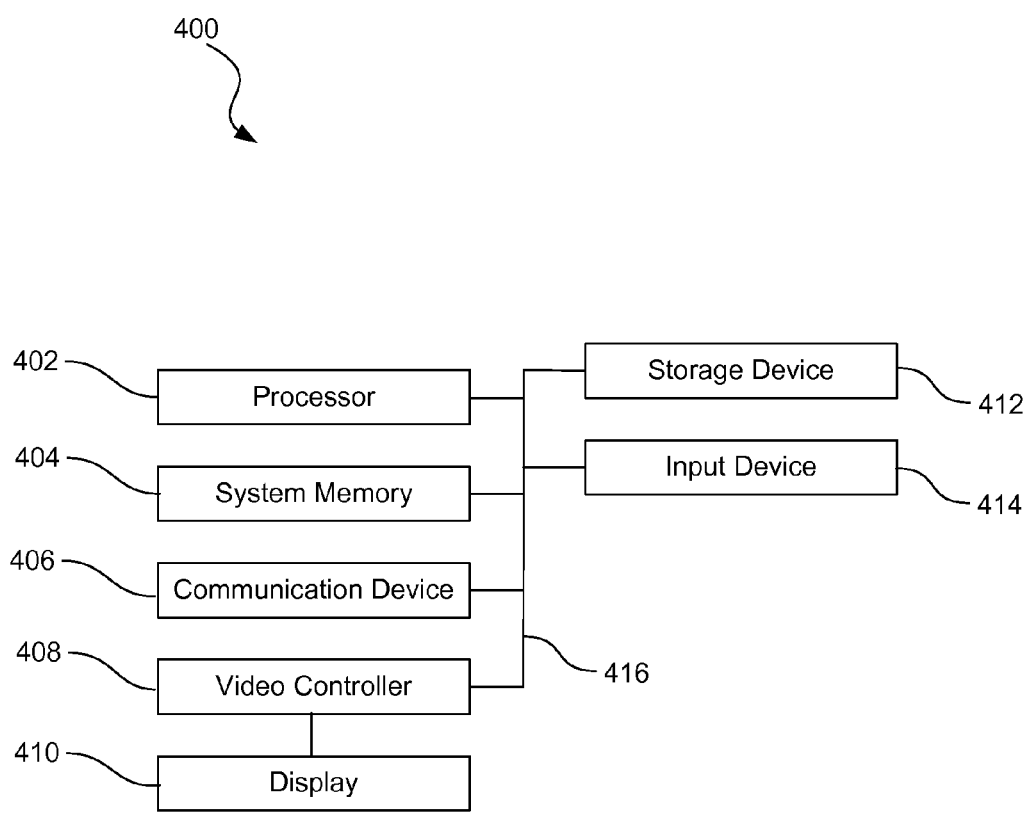
FIG. 4 is a diagram showing an illustrative computing system, according to one example of principles described herein.

FIG. 4 is a diagram showing an illustrative computing system 400 that may be used to perform functions associated with a publishing entity, a message broker, or a subscribing entity. Specifically, the computing system may be a computing device such as a desktop computer, laptop computer, tablet, or smart phone that is used by either a publishing entity or a subscribing entity to publish or consume messages. The computing system may also be a server that performs functions of the message broker or the data store.

According to the present example, the computing system 400 includes a processor 402, an input device 414, a storage device 412, a video controller 408, a system memory 404, a display 410, and a communication device 406, all of which are interconnected by one or more buses 416.

The storage device 412 may include a computer readable medium that can store data. The storage device 412 may include volatile memory storage devices such as Random Access Memory (RAM) as well as non-volatile memory storage devices such as solid state memory components. The computer readable medium may be a non-transitory tangible media.

In some examples, the communication device 406 may include a modem, network card, or any other device to enable the computing system 400 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 400 typically includes at least hardware capable of executing machine-readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 404, and/or any combination thereof, may be executed by a processor 402 to cause the processor 402 to carry out or implement in whole or in part the operation of the computing system 400, one or more of the methods. In some examples, such a processor 402 may execute the plurality of instructions in connection with a virtual computer system.

Some examples of processing systems described herein may include non-transitory, tangible, machine readable media that include executable code that when run by one or more processors (e.g., processor 402) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features.

One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   receiving from a publishing entity a message and a first piece of non-repudiation evidence that the message was sent by the publishing entity;
   time-stamping the first piece of non-repudiation evidence;
   storing the time-stamped first piece of non-repudiation evidence;
   broadcasting the message to a plurality of subscribing entities including a first subscribing entity;
   receiving from the first subscribing entity a second piece of non-repudiation evidence that the message was received by the first subscribing entity;
   time-stamping the second piece of non-repudiation evidence;
   storing the time-stamped second piece of non-repudiation evidence;
   receiving from the first subscribing entity a request for the first piece of non-repudiation evidence, the request accompanying a copy of the second piece of non-repudiation evidence; and
   providing the first piece of non-repudiation evidence to the first subscribing entity.

2. The method of claim 1, further comprising:
   receiving from the publishing entity, a request for the second piece of non-repudiation evidence, the request accompanying a copy of the first piece of non-repudiation evidence; and
   providing the publishing entity with a copy of the second piece of non-repudiation evidence.

3. The method of claim 1, further comprising, in response to receiving both the first piece of evidence and the second piece of evidence, sending a copy of the first piece of evidence to the first subscribing entity and a copy of the second piece of evidence to the publishing entity.

4. The method of claim 1, wherein receiving the second piece of evidence is received as a parameter of an acknowledge method used by a Java Message Service (JMS).

5. The method of claim 1, wherein the method is performed by a JMS server, and the publishing entity and the first subscribing entity comprise JMS clients.

6. The method of claim 1, wherein the first piece of evidence and the second piece of evidence are stored for a predefined period of time.

7. The method of claim 1, wherein the first piece of evidence and the second piece of evidence utilize public key cryptography.

8. The method of claim 1, further comprising receiving a topic name from the publishing entity along with the message.

9. The method of claim 8, wherein the first subscribing entity is a subscriber of the topic name.

10. The method of claim 1, further comprising, sending the message to a second subscribing entity.

11. The method of claim 10, further comprising:
    receiving from the second subscribing entity a third piece of evidence that the second subscribing entity has received the message;
    time-stamping the third piece of evidence; and
    storing the time-stamped third piece of evidence.

12. A system comprising:
    a processor; and
    a memory comprising machine readable instructions that when executed by the processor, cause the system to:
       receive, from a publishing entity, a message and a first piece of non-repudiation evidence that the message was sent by the publishing entity;
       time-stamp the first piece of non-repudiation evidence;
       broadcasting the message to a plurality of subscribing entities including a first subscribing entity;
       receive from the first subscribing entity a second piece of non-repudiation evidence that the subscribing entity has received the message;
       time-stamp the second piece of non-repudiation evidence;
       receive from the first subscribing entity a request for the first piece of non-repudiation evidence, the request accompanying a copy of the second piece of non-repudiation evidence; and
       provide the first piece of non-repudiation evidence to the first subscribing entity.

13. The system of claim 12, wherein the processor is further to cause the system to store the first piece of evidence and the second piece of evidence in an audit log.

14. The system of claim 12, wherein the system comprises a Java Messaging Service (JMS) server.

15. The system of claim 12, wherein the message is associated with a topic and the subscribing entity subscribes to the topic.

16. The system of claim 12, wherein the processor is further to cause the system to authenticate the first piece of evidence and the second piece of evidence.

17. A method comprising:
    receiving from a publishing entity a message to be published under a topic and a first piece of non-repudiation evidence that the message was sent by the publishing entity;
    processing the first piece of non-repudiation evidence;
    broadcasting the message to a plurality of subscribing entities;
    receiving from one of the plurality of subscribing entities a second piece of non-repudiation evidence that the one of the plurality of subscribing entities has received the message;
    processing the second piece of non-repudiation evidence;
    receiving from one of the plurality of subscribing entities a request for the first piece of non-repudiation evidence, the request accompanying a copy of the second piece of non-repudiation evidence; and
    providing the first piece of non-repudiation evidence to the one of the plurality of subscribing entities.

18. The method of claim 17, wherein processing the first piece of evidence comprises time-stamping the first piece of evidence and processing the second piece of evidence comprises time-stamping the second piece of evidence.

19. The method of claim 17, wherein first piece of evidence comprises a digital signature.

* * * * *